Nov. 28, 1950        D. C. HALEY        2,531,847

RESERVE FUEL SUPPLY

Filed June 14, 1948

Douglas C. Haley
INVENTOR.

BY *Clarence A. O'Brien*
*and Harvey B. Jacobson*
Attorneys

Patented Nov. 28, 1950

2,531,847

UNITED STATES PATENT OFFICE 2,531,847

RESERVE FUEL SUPPLY

Douglas C. Haley, Marietta, Ga.

Application June 14, 1948, Serial No. 32,870

1 Claim. (Cl. 158—46.5)

This invention relates to new and useful improvements and structural refinements in fuel supply systems for automobiles, trucks, and similar vehicles, the principal object of the invention is to eliminate the inconvenience and annoyance which is usually sustained when such vehicles exhaust their fuel supply, particularly in locations where the fuel cannot be easily replenished.

This object is achieved by the provision of what may be referred to as a reserve fuel supply, including an auxiliary fuel tank which is filled automatically and simultaneously with the filling of the main fuel tank of the vehicle, matters being so arranged that the fuel from the reserve or auxiliary fuel tank may be easily and conveniently delivered to the main fuel tank after the normal supply of fuel in the latter has become exhausted.

An important feature of the invention resides in the provision of means for effecting the transposition of fuel from the auxiliary tank to the main tank, when circumstances so require.

An additional feature of the invention lies in the provision of means for filling the auxiliary tank, more specifically, means for assuring that the auxiliary tank is filled simultaneously with the filling of the main tank.

An important advantage of the invention lies in its simplicity of construction and operation, and in its adaptability for use with new vehicles as well as with those already in existence.

Figure 1:
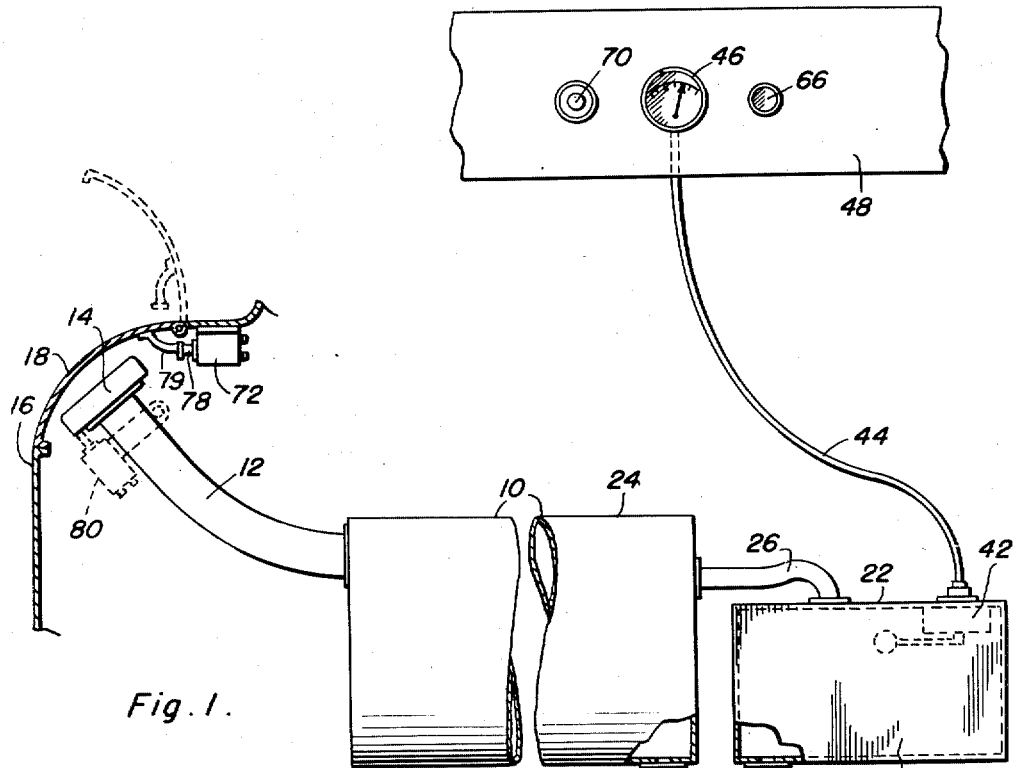
Figure 2:
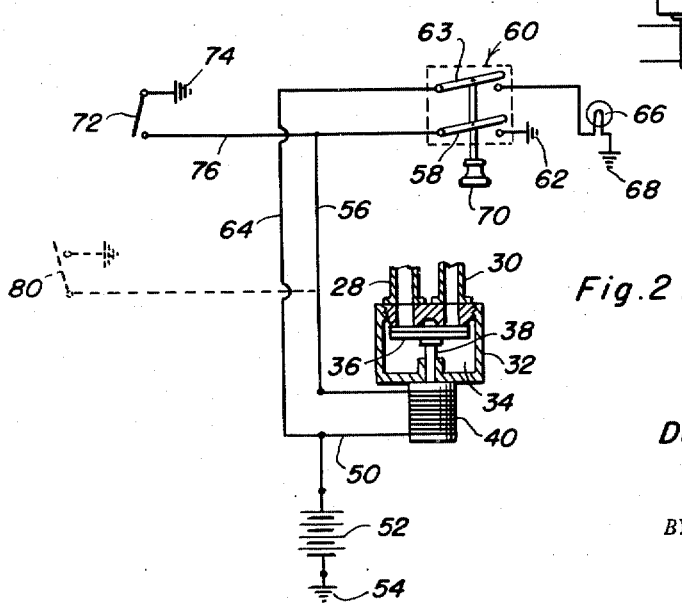

With the above more important objects and features in view and such other objects and features as may become apparent as this specification proceeds, the invention consists essentially of the construction and arrangement of parts as shown in the accompanying drawings in which:

Figure 1 is an elevational view of the invention, illustrating the same diagrammatically as being connected to the control panel of the vehicle with which it is used, and Figure 2 is a wiring diagram of the electrical components of the invention.

Like characters of reference are employed to designate like parts in the specification and throughout the several views.

Referring now to the accompanying drawings in detail, the reference character 10 designates a main fuel tank of a vehicle such as an automobile, or the like, the same being provided with the usual filler neck 12 which, in turn, is equipped with a removable cap or cover 14. In some instances, the cap 14 is disposed under a fender 16 of the vehicle, and the fender is, of necessity, provided with an openable door 18, so that access to the cap 14 may be had.

The invention resides in the provision of an auxiliary fuel tank 20 of a substantially smaller capacity with respect to the main tank 10, the tank 20 preferably being disposed on the same level as the tank 10 but being somewhat lower in "height" so to speak, so that the upper wall 22 thereof is disposed substantially below the corresponding upper wall 24 of the tank 10 as is clearly shown in the accompanying drawings.

An air conduit 26 connects together the upper portions of the tanks 10, 20, while fuel conduits 28, 30 communicating with the tanks 10, 20, respectively, are connected together by means of an electro-magnetically actuated valve 32.

It may be explained at this point that the conduit 26 will effectively prevent air locks in the tank 20, while opening of the valve 32 affords assurance that the tank 20 is filled simultaneously with the filling of the tank 10, as long as the valve 32 is open.

The valve 32 is of any conventional construction, such as for example is illustrated in the accompanying Figure 2 wherein the fuel conduits 28, 30 enter a valve chamber 34 wherein a disc 36 constitutes an openable closure for the conduit, the disc 36 being actuated by means of a reciprocable armature 38 which, in turn, is energizable by means of a solenoid 40.

A conventional level indicating tank unit 42 is provided in the auxiliary fuel tank 20, the unit 42 being operatively connected as at 44 to an indicator gauge 46 mounted upon an instrument panel 48 of the vehicle with which the invention is used. Needless to say, an additional level indicator may be provided in the tank 10.

The solenoid 40 of the valve 32 is electrically connected at 50 to one terminal of a storage battery 52 with which the vehicle is, of course, provided, the remaining terminal of the battery being grounded, as at 54. The solenoid 40 is also in an electrical circuit indicated at 56 with one side, so to speak, 58 of a double pole switch 60, the side 58 of this switch being grounded as at 62 when the switch is closed.

The remaining side 63 of the switch 60 is electrically connected at 64 to the battery 52 and also, to an indicator lamp 66, the latter being grounded as at 68, matters being so arranged that when the switch 60 is closed, the valve 32 is open and the lamp 66 is energized, while on the other hand when the switch 60 is open, the valve 32 is closed and no current is delivered to the lamp 66.

The switch 60 is normally open, but it may be closed by simply pulling a knob or button 70 provided on the aforementioned panel 48.

A normally closed micro-switch 72 is mounted under the aforementioned fender 16, the switch 72 being grounded as at 74 and also being electrically connected as at 76 and 56 to the solenoid 40. The switch 72 includes a projectable and retractable plunger 78 which, when the switch is open, is retracted, as will be clearly understood.

The plunger 78 is normally retained in the retracted position by means of a finger 79 secured to the inner surface of the openable door 18 of the fender 16, so that as long as the door 18 is closed, the switch 72 is open and the valve 32 is also closed, as will be clearly apparent. However, upon opening of the door 18, the switch 72 becomes closed and the valve 32 is opened, in much the same manner as presents itself upon closing of the switch 60.

As an alternative form of construction, primarily intended for use in vehicles not equipped with the door 18, the switch 72 may be installed in a position on the filler neck 12 as indicated at 80, matters being so arranged that the switch 80 is open when the cap 14 is in position on the filler neck, but upon removing the cap, the switch 80 becomes closed.

Having thus described the construction of the invention, its method of operation will now be explained.

Assuming the tanks 10 and 20 to be filled and the valve 32 closed, the vehicle may proceed on its travel until the supply of fuel in the tank 10 is exhausted. Thereupon, by simply pulling the knob 70 outwardly so as to close the switch 60, the operator of the vehicle may readily open the valve 32, thus facilitating transposition of fuel from the tank 20 to the tank 10, whereby the vehicle may be driven until refueling, or until the supply of fuel in the tank 20 is exhausted, whichever occurs first.

Assuming then that the vehicle reaches a refueling source, the valve 32 may be intentionally or unintentionally closed (since it is not necessary to retain the switch 60 in a closed position while refueling), but assurance must be had that the auxiliary tank 20 is refilled simultaneously with the main tank 10, so that the contents of the auxiliary tank may be available for future occasions. This assurance is had by the provision of the switch 72 (or 80), which opens the valve 32 as soon as the door 18 or the cap 14 are opened, thus facilitating filling of the tank 20 as well as of the tank 10, through the medium of the ducts 28, 30.

The indicator lamp 66, being energized when the valve 32 is open by closing the switch 60, will, of course, indicate to the operator that he has a limited but a substantial supply of fuel to carry the vehicle to refueling station.

It is believed that the advantages and use of the invention will be clearly apparent from the foregoing disclosure and accordingly, further description thereof at this point is deemed unnecessary.

While in the foregoing there has been shown and described the preferred embodiment of this invention it is to be understood that minor changes in the details of construction, combination and arrangement of parts may be resorted to without departing from the spirit and scope of the invention as claimed.

Having described the invention, what is claimed as new is:

In an automotive vehicle including a main fuel tank having a filler neck and a removable cap thereon, a reserve fuel supply comprising an auxiliary fuel tank positioned externally of the main tank, an air conduit connecting upper portions of said tanks so that air may pass from the reserve tank to the main tank during the filling operation, a fuel conduit connecting lower portions of said tanks, a normally closed electromagnetic valve provided in said fuel conduit, an electric switch secured to said filler neck and provided with a depressible plunger, said plunger being engageable by said cap and retained thereby in its depressed position wherein said switch is open, and an electric connection between said switch and said valve, whereby the valve may be automatically opened by the removal of said cap.

DOUGLAS C. HALEY.

REFERENCES CITED

The following references are of record in the file of this patent:

UNITED STATES PATENTS

| Number | Name | Date |
| --- | --- | --- |
| 948,279 | Hofacker | Feb. 1, 1910 |
| 1,361,614 | Powers | Dec. 7, 1920 |
| 1,990,605 | Johnson | Feb. 12, 1935 |
| 2,103,448 | Castledine | Dec. 28, 1937 |
| 2,361,148 | Paoli | Oct. 23, 1944 |
| 2,394,431 | Curtis et al. | Feb. 5, 1946 |
| 2,394,506 | Woods | Feb. 5, 1946 |
| 2,476,203 | Manol | July 12, 1949 |

FOREIGN PATENTS

| Number | Country | Date |
| --- | --- | --- |
| 880,067 | France | Dec. 18, 1942 |